(12) United States Patent
Axinte et al.

(10) Patent No.: US 10,040,151 B2
(45) Date of Patent: Aug. 7, 2018

(54) MACHINE TOOLS

(71) Applicant: ROLLS-ROYCE plc, London (GB)

(72) Inventors: Dragos Aurelian Axinte, Nottingham (GB); Xin Dong, Nottingham (GB); James Kell, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 202 days.

(21) Appl. No.: 15/073,054

(22) Filed: Mar. 17, 2016

(65) Prior Publication Data
US 2016/0279750 A1    Sep. 29, 2016

(30) Foreign Application Priority Data

Mar. 23, 2015  (GB) .................................. 1504846.5

(51) Int. Cl.
| | | |
|---|---|---|
| *G06F 19/00* | (2018.01) | |
| *B23Q 1/48* | (2006.01) | |
| *B62D 57/032* | (2006.01) | |
| *B23Q 9/00* | (2006.01) | |
| *B25J 9/00* | (2006.01) | |
| *B25H 1/00* | (2006.01) | |
| *G05B 19/19* | (2006.01) | |

(52) U.S. Cl.
CPC ............. *B23Q 1/48* (2013.01); *B23Q 9/0014* (2013.01); *B25H 1/0042* (2013.01); *B25J 9/0057* (2013.01); *B62D 57/032* (2013.01); *G05B 19/19* (2013.01); *G05B 2219/49361* (2013.01)

(58) Field of Classification Search
CPC ........................................................ B23Q 1/48
See application file for complete search history.

(56) References Cited

U.S. PATENT DOCUMENTS

| | | | | |
|---|---|---|---|---|
| 4,662,465 A | * | 5/1987 | Stewart ................. | B62D 57/02 180/8.1 |
| 5,468,099 A | | 11/1995 | Wheetley et al. | |
| 5,656,905 A | * | 8/1997 | Tsai ..................... | B23Q 1/5462 318/560 |

(Continued)

FOREIGN PATENT DOCUMENTS

| | | |
|---|---|---|
| EP | 2781312 A2 | 9/2014 |
| JP | S60-104474 A | 6/1985 |
| WO | 2010/043284 A2 | 4/2010 |

OTHER PUBLICATIONS

Jul. 29, 2016 Search Report issued in European Patent Application No. 16160582.9.

(Continued)

*Primary Examiner* — Vincent Tran
(74) *Attorney, Agent, or Firm* — Oliff PLC

(57) ABSTRACT

A machine tool comprising: a first body; a first leg, a second leg, and a third leg coupled to the first body via first joints and configured to support at least the first body; a second body including a tool holder; a fourth leg, a fifth leg, and a sixth leg coupled to the second body via second joints and configured to support at least the second body; and a first actuator coupled to the first body and to the second body, the first actuator being configured to cause rotational motion between the first body and the second body to enable a change in walking direction of the machine tool and/or to enable a change in machining stiffness and a change in work volume of the machine tool.

16 Claims, 14 Drawing Sheets

(56) References Cited

U.S. PATENT DOCUMENTS

| | | | |
|---|---|---|---|
| 8,225,692 B2* | 7/2012 | Kock | B23Q 1/5462 74/490.03 |
| 2006/0214622 A1* | 9/2006 | Summer | B62D 57/032 318/568.12 |
| 2006/0235551 A1* | 10/2006 | Goh | H04R 1/1091 700/94 |
| 2008/0257096 A1 | 10/2008 | Zhu et al. | |
| 2010/0107795 A1 | 5/2010 | Viola | |
| 2014/0263883 A1* | 9/2014 | Rushworth | B25J 9/0057 248/163.1 |

OTHER PUBLICATIONS

Aug. 20, 2015 Search Report issued in British Patent Application No. 1504846.5.

Raibert, M. et al; "BigDog, the rough-terrain quadruped robot;" The International Federation of Automatic Control; 2008; pp. 10823-10825.

Byrd J.S. et al; "A six-legged telerobot for nuclear applications development;" The International Journal of Robotics Research; 1990; vol. 9; No. 2; pp. 43-52.

Guinea, D. et al; "Robot learning to walk: an architectural problem for intelligent controllers;" International Symposium on Intelligent Control; 1993; pp. 493-498.

Showalter, M. "Work space analysis and walking algorithm development for a radially symmetric hexapod robot;" Thesis submitted to the Virginia Polytechnic Institute and State University; 2008; pp. 1-177.

Showalter, M. et al; Workspace analysis for the limbs of a hexapedal robot walking gait generation algorithm development; ASME; 2008; pp. 1207-1214.

* cited by examiner

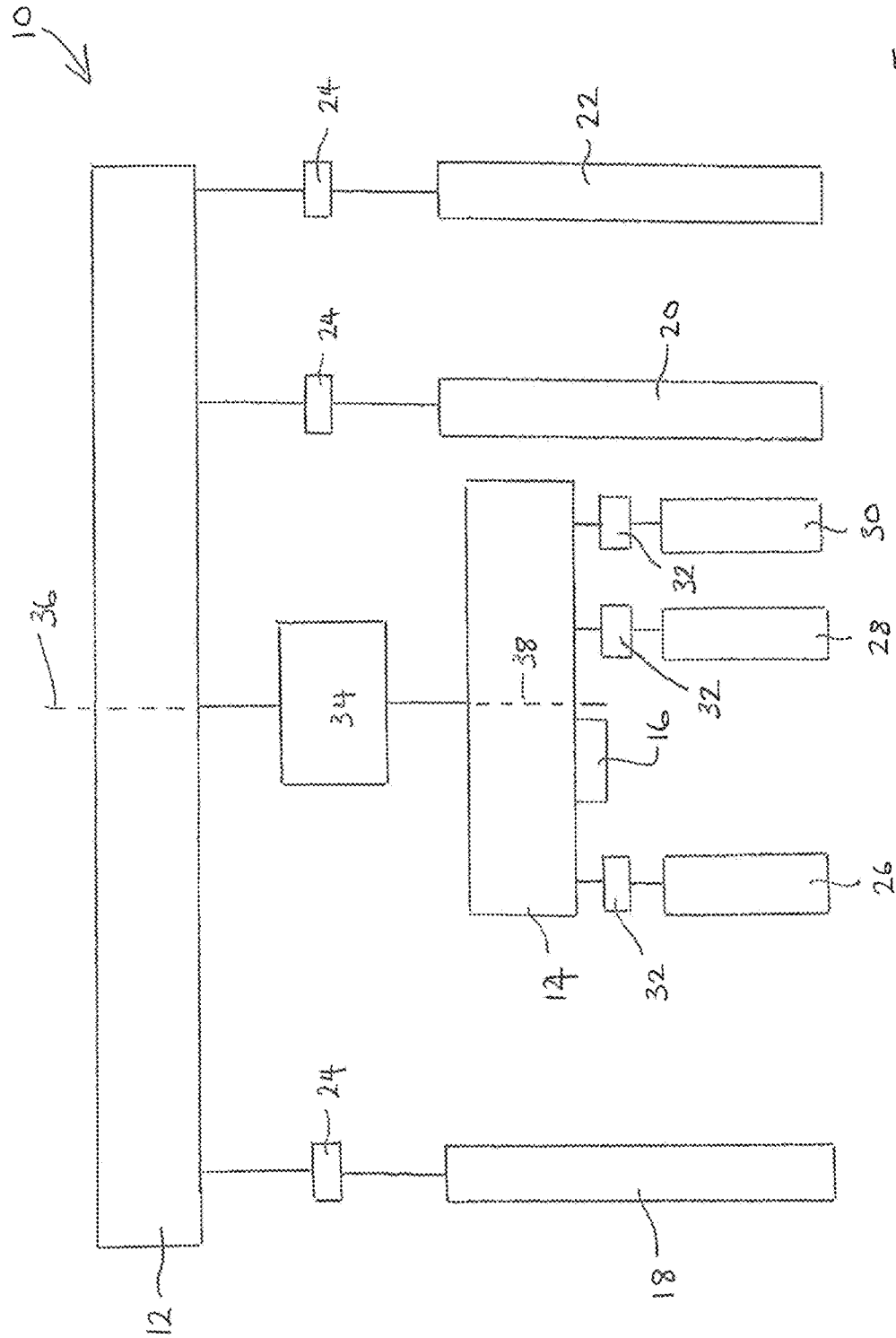

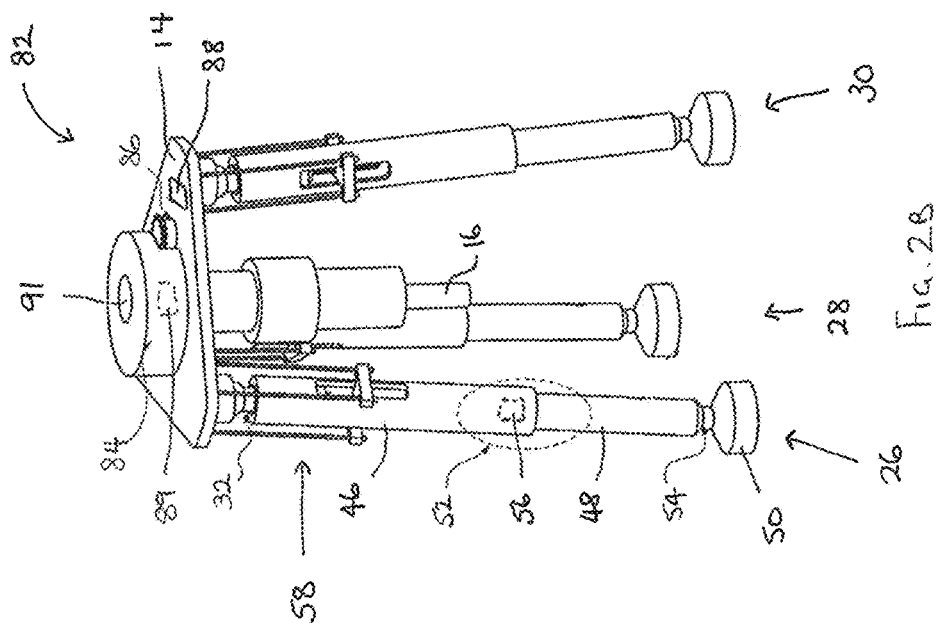
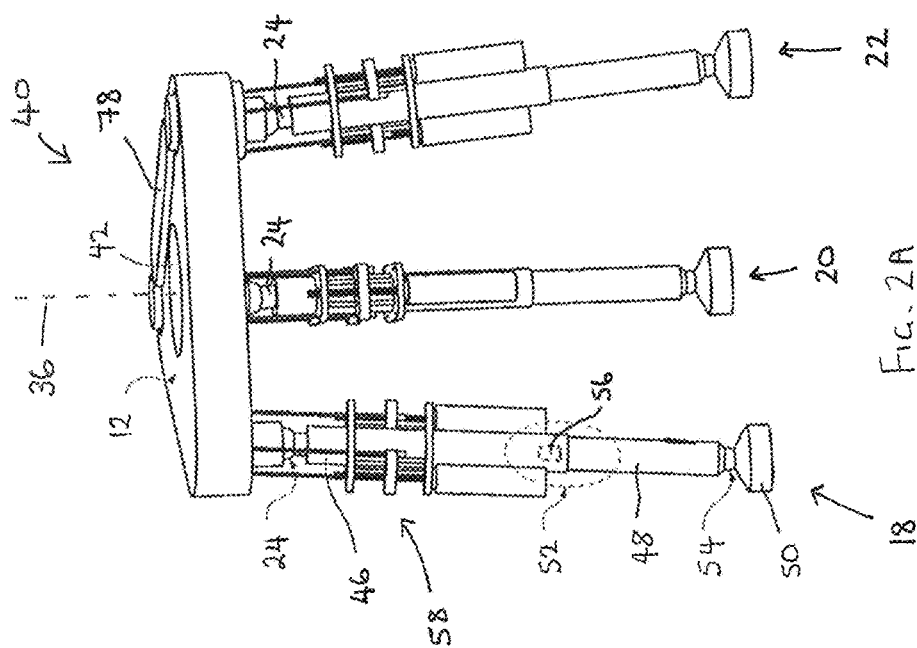

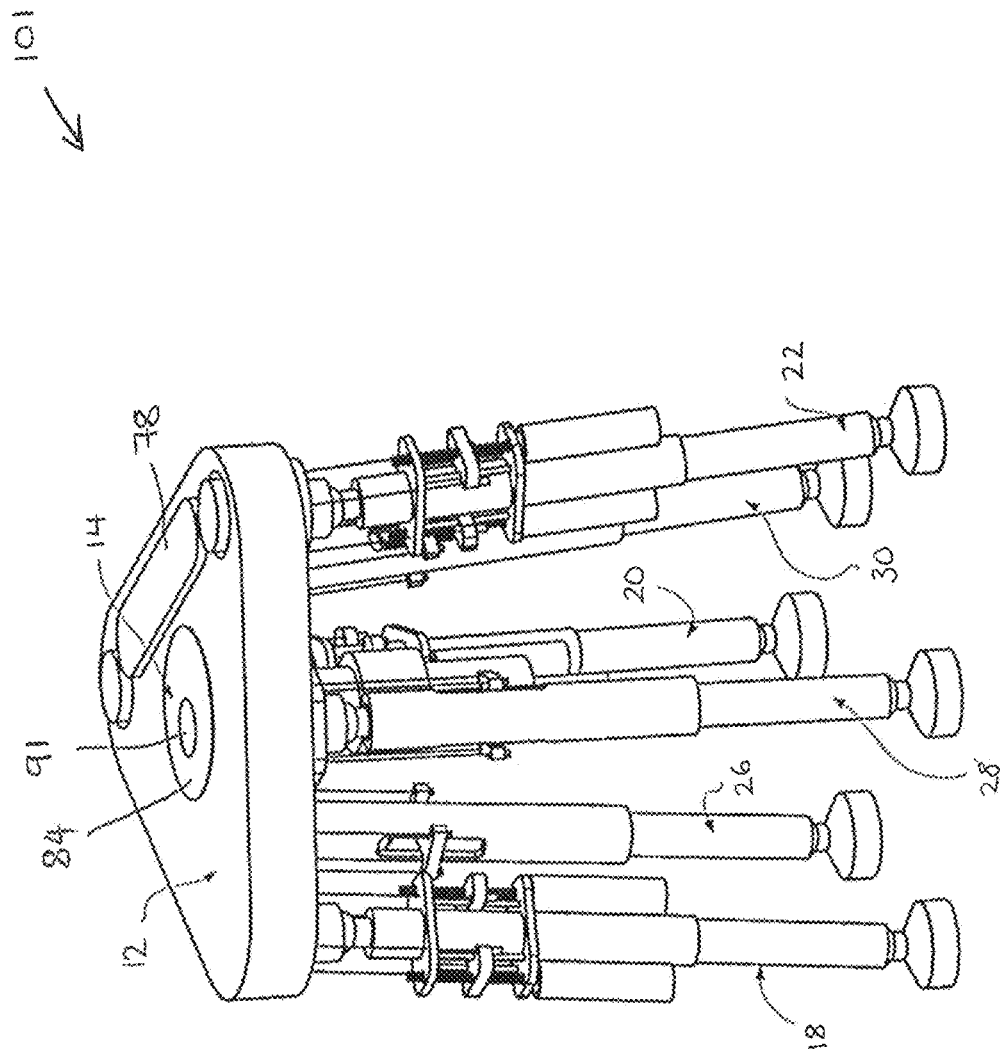

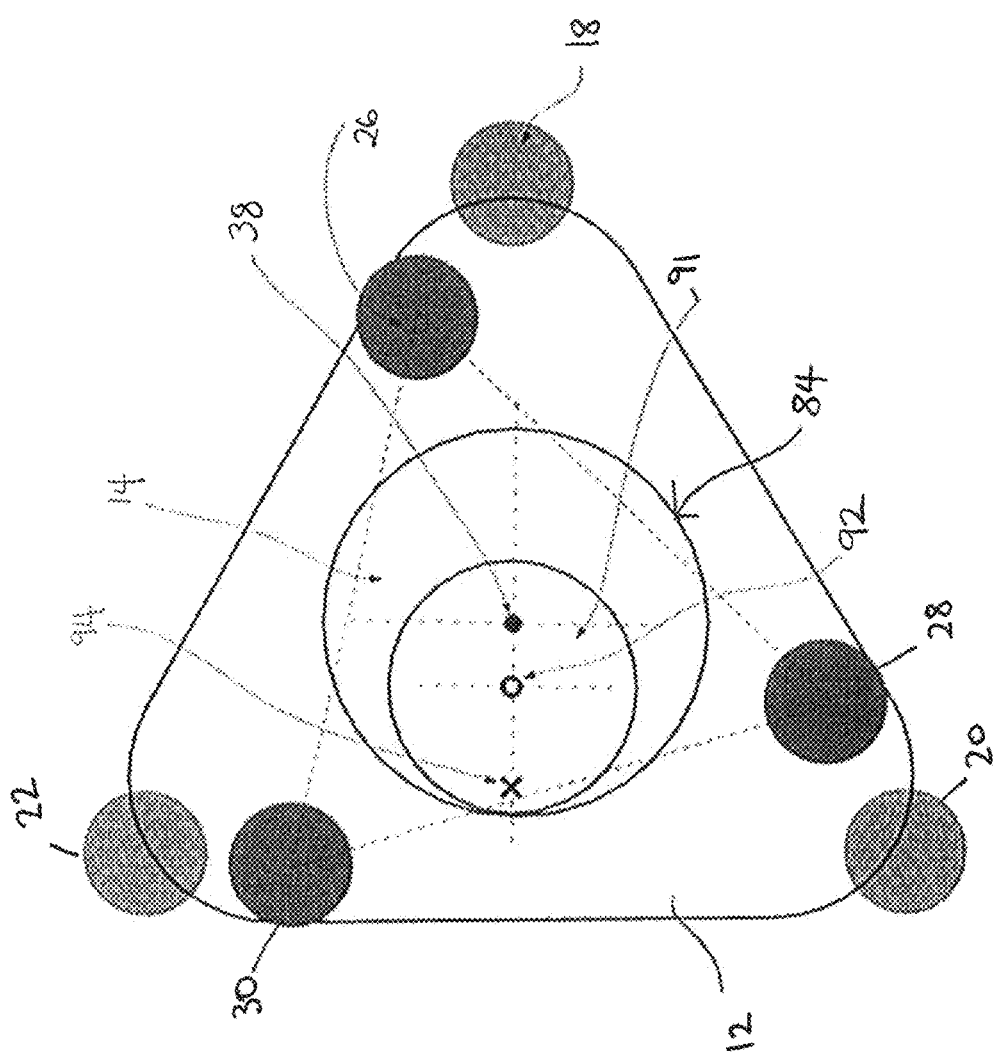

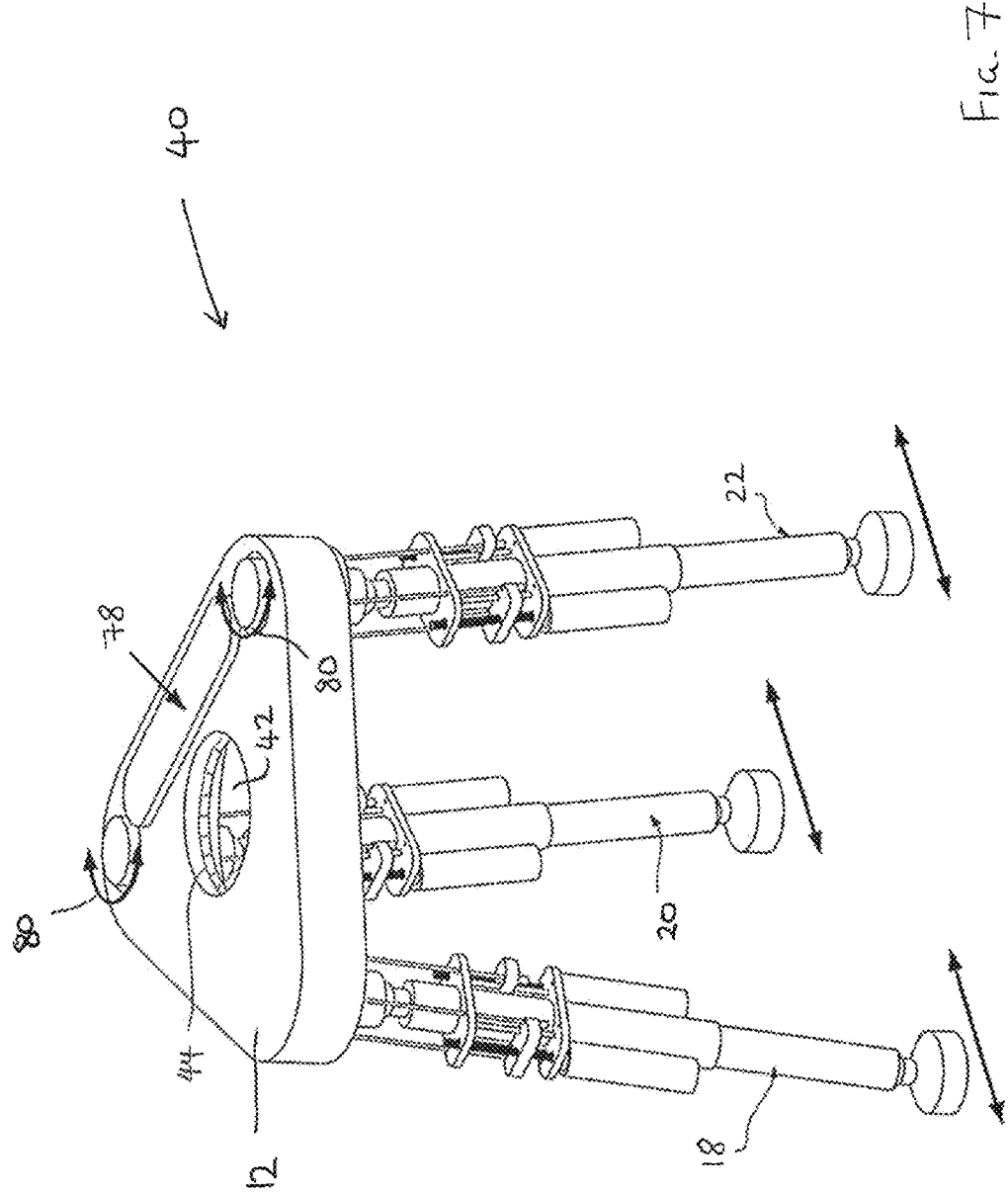

MACHINE TOOLS

TECHNOLOGICAL FIELD

The present disclosure concerns machine tools, methods of controlling machine tools, and apparatus to control machine tools.

BACKGROUND

Machine tools, such as Stewart platforms, may be used to machine an object in an industrial environment. For example, a machine tool may be used in many different systems, across a wide range of technologies, for example in nuclear engineering, aircraft, gas turbine engines, industrial plants, shipbuilding, buildings, roads and pipelines.

In some systems, the environment may be hazardous (such as in nuclear engineering) and/or include confined spaces (such as in a gas turbine engine). In such systems, it may be challenging and/or dangerous for a human operator to position a machining tool at a desired location to machine and/or inspect a desired object.

BRIEF SUMMARY

According to various examples there is provided a machine tool comprising: a first body; a first leg, a second leg, and a third leg coupled to the first body via first joints and configured to support at least the first body; a second body including a tool holder; a fourth leg, a fifth leg, and a sixth leg coupled to the second body via second joints and configured to support at least the second body; and a first actuator coupled to the first body and to the second body, the first actuator being configured to cause rotational motion between the first body and the second body to enable a change in walking direction of the machine tool and/or to enable a change in machining stiffness and a change in work volume of the machine tool.

The first body may have a first axis and the second body may have a second axis. The first axis and the second axis may be offset relative to one another so that the first body and the second body are eccentric.

The first body may have a first axis and the second body may have a second axis. The first axis and the second axis may define a common centre of the first body and the second body so that the first body and the second body are concentric.

The first actuator may be configured to cause rotational motion between the first body and the second body while the first leg, the second leg, the third leg, the fourth leg, the fifth leg and the sixth leg contact a surface to change the machining stiffness of the machine tool.

The first leg, the second leg, the third leg, the fourth leg, the fifth leg, and the sixth leg may each comprise: a second actuator and a prismatic joint, the second actuators may be configured to move the respective legs between an extended state and a retracted state at their respective prismatic joints.

The fourth leg, the fifth leg, and the sixth leg may be configured to support the machine tool while in the extended state and while the first leg, the second leg and the third leg are in the retracted state, to enable the first actuator to cause rotational motion between the first body and the second body to enable a change in walking direction of the machine tool.

The first leg, the second leg and the third leg may each comprise a third actuator. The third actuators may be configured to pivot the respective first, second and third legs about their respective first joints to enable the machine tool to walk.

The second leg and the third leg may be configured to rotate relative to the first body. The machine tool may comprise a fourth actuator to rotate the second and third legs to change the state of the machine tool between a walking state and a machining state.

The second body may include a first cylindrical protrusion and the first actuator may comprise a gear positioned adjacent to the first cylindrical protrusion. The first body may define a cavity therein for receiving the first cylindrical protrusion and the gear. The first body may include a plurality of teeth within the cavity for engaging the gear of the first actuator.

The second body may include a second cylindrical protrusion positioned within the first cylindrical protrusion. The second cylindrical protrusion may be eccentric with the second axis of the second body and with the first cylindrical protrusion. The second cylindrical protrusion may be coupled to the tool holder. The tool holder may be eccentric with the second cylindrical protrusion.

According to various examples there is provided a method of controlling a machine tool as described in any of the preceding paragraphs, the method comprising: receiving a signal from a user input device and/or from a sensor; and controlling the first actuator, using the received signal, to cause rotational motion between the first body and the second body.

The first leg, the second leg, the third leg, the fourth leg, the fifth leg, and the sixth leg may each comprise: a second actuator and a prismatic joint. The method may further comprise controlling the second actuators of the first, second, and third legs or the second actuators of the fourth, fifth, and sixth legs, to move the respective legs between an extended state and a retracted state at their respective prismatic joints.

The first leg, the second leg and the third leg may each comprise a third actuator. The method may further comprise controlling the third actuators to pivot the respective first, second and third legs about their respective first joints to enable the machine tool to walk.

The second leg and the third leg may be configured to rotate relative to the first body and the machine tool may further comprise a fourth actuator for rotating the second and third legs relative to the first body. The method may further comprise controlling the fourth actuator to rotate the second and third legs to change the state of the machine tool between a walking state and a machining state.

According to various examples there is provided a computer program that, when read by a computer, causes performance of the method as described in any of the preceding paragraphs.

According to various examples there is provided a non-transitory computer readable storage medium comprising computer readable instructions that, when read by a computer, causes performance of the method as described in any of the preceding paragraphs.

According to various examples there is provided apparatus to control a machine tool, the apparatus comprising: a controller to perform the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 1 illustrates a schematic diagram of a machine tool according to various examples;

FIG. 2A illustrates a perspective view of a first part of another machine tool according to various examples;

FIG. 2B illustrates a perspective view of a second part of another machine tool according to various examples;

FIG. 3 illustrates a perspective view of another machine tool include the first and second parts illustrated in FIGS. 2A and 2B respectively;

FIG. 6 illustrates a plan view of the machine tool illustrated in FIG. 3;

FIG. 7 illustrates a perspective view of the first part illustrated in FIG. 2A;

DETAILED DESCRIPTION

Figure 5:
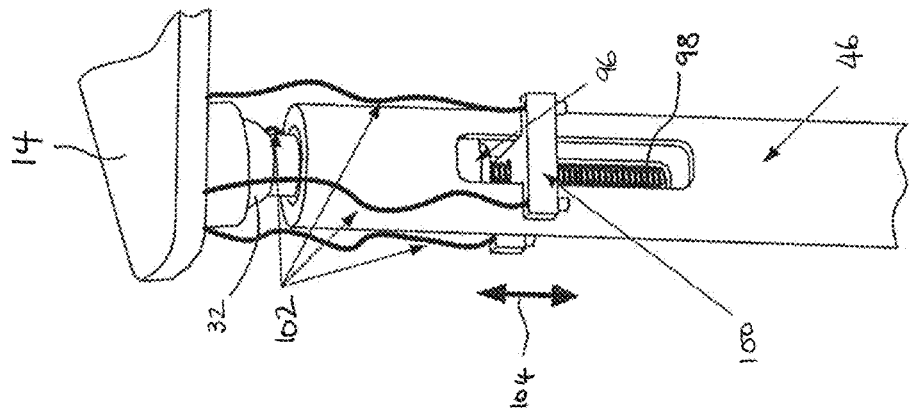
FIG. 5 illustrates a perspective view of a second joint of the machine tool illustrated in FIG. 3.

In the following description, the terms 'connected' and 'coupled' mean operationally connected and coupled. It should be appreciated that there may be any number of intervening components between the mentioned features, including no intervening components.

FIG. 1 illustrates a schematic diagram of a machine tool 10 including a first body 12, a second body 14 including a tool holder 16, a first leg 18, a second leg 20, a third leg 22, a plurality of first joints 24, a fourth leg 26, a fifth leg 28, a sixth leg 30, a plurality of second joints 32, and a first actuator 34.

The first body 12 may have any suitable shape and dimensions and defines a first axis 36. The second body 14 may have any suitable shape and dimensions and defines a second axis 38. As illustrated in FIG. 1, the first axis 36 and the second axis 38 define a common centre of the first body 12 and the second body 14 so that the first body 12 and the second body 14 are concentric. In other examples, the first axis 36 and the second axis 38 are offset relative to one another so that the first body 12 and the second body 14 are eccentric.

The first leg 18, the second leg 20, and the third leg 22 are coupled to the first body 12 via the plurality of first joints 24 and are configured to support at least the first body 12. The fourth leg 26, the fifth leg 28, and the sixth leg 30 are coupled to the second body 14 via second joints 32 and are configured to support at least the second body 14.

The tool holder 16 is configured to receive one or more tools to enable the machine tool 10 to machine an object. For example, the tool holder 16 may be configured to receive one or more of: a blending tool, a drill, a laser cutting tool, an imaging sensor (for example, a charge coupled device camera), a Raman spectrometer, a fluorescent penetrant applicator, and an ultraviolet (UV) inspection device and so on.

The first actuator 34 is coupled to the first body 12 and to the second body 14. The first actuator 34 is configured to cause rotational motion between the first body 12 and the second body 14 to enable a change in walking direction of the machine tool 10 and/or to enable a change in machining stiffness of the machine tool 10 and a change in the work volume of the machine tool 10 (that is, a change in the volume of space that the tool within the tool holder 16 may move through). The first actuator 34 may comprise any suitable apparatus or device for rotating the first body 12 and the second body 14 relative to one another. For example, the first actuator 34 may comprise a servomotor (such as a pie motor), a pneumatic actuator, a hydraulic actuator, an electric linear motor. In some examples, the first actuator 34 may be mounted eccentric to the first axis 36 and is arranged to provide rotational movement around its own axis.

FIGS. 2A and 7 illustrate perspective views of a first part 40 of another machine tool 101 (as illustrated in FIG. 3). The machine tool 101 is similar to the machine tool 10 illustrated in FIG. 1 and where the features are similar, the same reference numerals are used.

The first part 40 of the machine tool 101 includes the first body 12, the first leg 18, the second leg 20, and the third leg 22. The first part 40 may be module of the machine tool 101. As used herein, the wording 'module' refers to a device or apparatus where one or more features are included at a later time, and possibly, by another manufacturer or by an end user. For example, where the first part 40 is a module, the machine tool 101 may be assembled by a different manufacturer to the manufacturer of the first part 40.

The first body 12 (which may also be referred to as the first platform) has a triangular shape and defines a cavity 42 therein. The cavity 42 extends through the first body 12 and is positioned at the centre of the first body 12. As illustrated in FIG. 7, the first body 12 includes a plurality of teeth 44 within the cavity 42.

The first leg 18, the second leg 20 and the third leg 22 each comprise an upper part 46, a lower part 48, and a foot part 50. The upper part 46 and the lower part 48 are telescopically arranged and form a prismatic joint 52. The foot part 50 is coupled to the lower part 48 via a spherical joint 54 and may include apparatus for securing the foot part 50 to a surface (for example, the foot part 50 may include an air pump to enable the foot part 50 to form a vacuum with the surface to secure the machine tool 101 to the surface). By way of another example, the foot part 50 may include an electromagnet to enable the foot part to attach to the surface to secure the machine tool 101 to the surface.

The first leg 18, the second leg 20 and the third leg 22 each comprise a second actuator 56 that is configured to move the respective leg between an extended state and a retracted state at their respective prismatic joints 52. In more detail, the second actuator 56 may comprise a servomotor that is configured to control the telescopic movement of the lower part 48 and the upper part 46 to move the leg 18, 20, 22 between the extended state and the retracted state.

Figure 4:
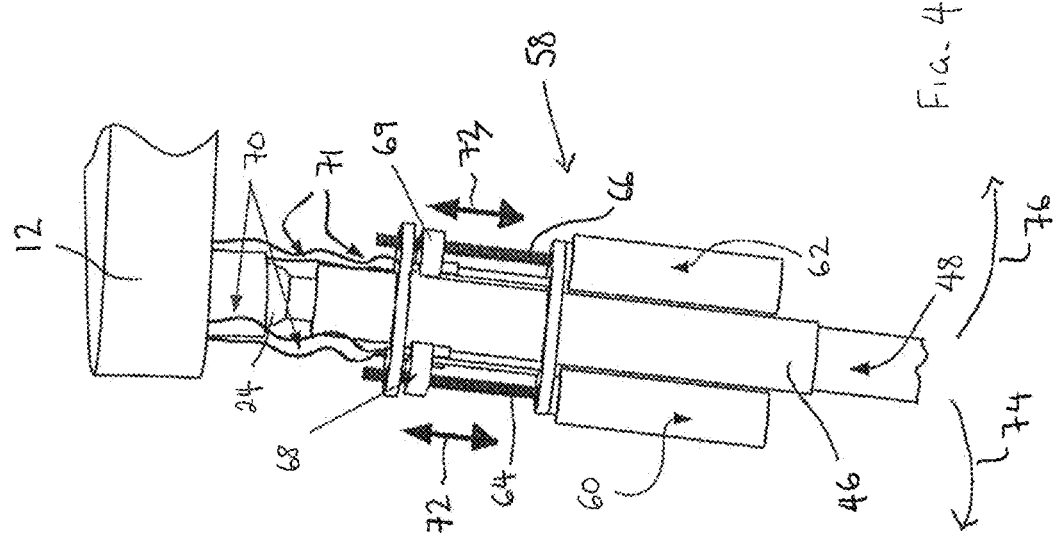
FIG. 4 illustrates a perspective view of a first joint of the machine tool illustrated in FIG. 3.

The first leg 18, the second leg 20 and the third leg 22 each comprise a third actuator 58 that is configured to pivot the first, second and third legs 18, 20, 22 about their respective first joints 24 to enable the machine tool 101 to walk. In more detail and with reference to FIG. 4, the third actuator 58 includes a first servomotor 60, a second servomotor 62, a first screw 64 coupled to the first servomotor 60, a second screw 66 coupled to the second servomotor 62, a first cable anchor 68, a second cable anchor 69, a first pair of cables 70 coupled to the first cable anchor 68 and to the first body 12, and a second pair of cables 71 coupled to the second cable anchor 69 and to the first body 12.

The first servomotor 60 is configured to rotate the first screw 64 to move the first cable anchor 68 up and down (as indicated by arrow 72) to provide and release tension in the first pair of cables 70. The second servomotor 62 is configured to rotate the second screw 66 to move the second cable anchor 69 up and down (as indicated by arrow 73) to provide and release tension in the second pair of cables 71. Where the first pair of cables 70 are under tension and the second pair of cables 71 are under less tension than the first pair of cables 70 (for example, they may be slack (that is, not under tension)), the leg pivots about the first joint 24 in the direction of arrow 74. Where the second pair of cables 71 are under tension and the first pair of cables 70 are under less tension than the second pair of cables 71 (for example, they may be slack (that is, not under tension)), the leg pivots about the first joint 24 in the direction of arrow 76. Consequently, the first joint 24 (which is a spherical joint on its own) and the third actuator 58 may form a revolute joint having a single degree of freedom. It should be appreciated that where the first pair and second pair of cables 70, 71 are slack, the first joint 24 forms a spherical joint having three degrees of freedom.

As illustrated in FIG. 7, the second leg 20 and the third leg 22 are configured to rotate relative to the first body 12 and the first part 40 comprises a fourth actuator 78 to rotate the second and third legs 20, 22 to change the state of the machine tool 101 between a walking state and a machining state. For example, the fourth actuator 78 may include a motor and a gear system that meshes with gearing on the second and third legs 20, 22 to rotate the second and third legs 20, 22 in the directions of arrows 80 (that is, rotation about the longitudinal axes of the second and third legs 20, 22).

FIG. 2B illustrates a perspective view of a second part 82 of the machine tool 101 (as illustrated in FIG. 3). The second part 82 of the machine tool 101 includes the second body 14, the fourth leg 26, the fifth leg 28, and the sixth leg 30. The second part 82 may be module of the machine tool 101. For example, where the second part 82 is a module, the machine tool 101 may be assembled by a different manufacturer to the manufacturer of the second part 82.

The second body 14 (which may also be referred to as the second platform) has a triangular shape and includes a first cylindrical protrusion 84 and a second cylindrical protrusion 91 positioned within the first cylindrical protrusion 84. The first actuator 14 comprises a gear 86 that is positioned adjacent to the first cylindrical protrusion 84 and a servomotor 88 for rotating the gear 86. As illustrated in FIG. 3, the first cylindrical protrusion 84 and the gear 86 may be received within the cavity 42 of the first body 12 so that the gear 86 engages the plurality of teeth 44 within the cavity 42. The second cylindrical protrusion 91 is coupled to the tool holder 16 and comprises a fifth actuator 89 for driving a tool held by the tool holder 16.

FIG. 6 illustrates a plan view of the machine tool 101 and the eccentric arrangement of the first body 12 and the second body 14 according to an example. In particular, FIG. 6 illustrates that the second axis 38 of the second body 14 is offset from the centre axis 92 of the second cylindrical protrusion 91. Furthermore, FIG. 6 illustrates that the centre axis 94 of a tool in the tool holder 16 is offset from both the centre axis 92 of the second cylindrical protrusion 91 and the second axis 38 of the second body 14.

Returning to FIG. 2B, the fourth leg 26, the fifth leg 28 and the sixth leg 30 each comprise an upper part 46, a lower part 48, and a foot part 50. The upper part 46 and the lower part 48 are telescopically arranged and form a prismatic joint 52. The foot part 50 is coupled to the lower part 48 via a spherical joint 54 and may include apparatus for securing the foot part 50 to a surface. For example, the foot part 50 may include an air pump to enable the foot part 50 to form a vacuum with the surface to secure the machine tool 101 to the surface. By way of another example, the foot part 50 may include an electromagnet to enable the foot part to attach to the surface to secure the machine tool 101 to the surface.

The fourth leg 26, the fifth leg 28 and sixth third leg 30 each comprise a second actuator 56 that is configured to move the leg between an extended state and a retracted state at their respective prismatic joints 52. In more detail, the second actuator 56 may comprise a servomotor that is configured to control the telescopic movement of the lower part 48 and the upper part 46 to move the leg between the extended state and the retracted state.

The fourth leg 26, the fifth leg 28 and the sixth leg 30 each comprise a third actuator 58 that is configured to prevent pivoting of the respective fourth, fifth and sixth legs 26, 28, 30 about their respective second joints 32 to enable the machine tool 101 to walk. In more detail and with reference to FIG. 5, the third actuator 58 includes a servomotor 96, a screw 98 coupled to the servomotor 96, a cable anchor 100, and a plurality of cables 102 coupled to the cable anchor 100 and to the second body 14.

The servomotor 96 is configured to rotate the screw 98 to move the cable anchor 100 up and down (as indicated by arrow 104) to provide and release tension in the plurality of cables 102. Where the plurality of cables 102 are under tension, the fourth, fifth and sixth legs 26, 28, 30 are prevented from pivoting about the second joints 32 (in other words, the legs 26, 28, 30 are locked in position relative to the second body 14). Where the plurality of cables 102 are slack, the second joints 32 of the fourth, fifth and sixth legs 26, 28, 30 form spherical joints having three degrees of freedom.

Figure 8:
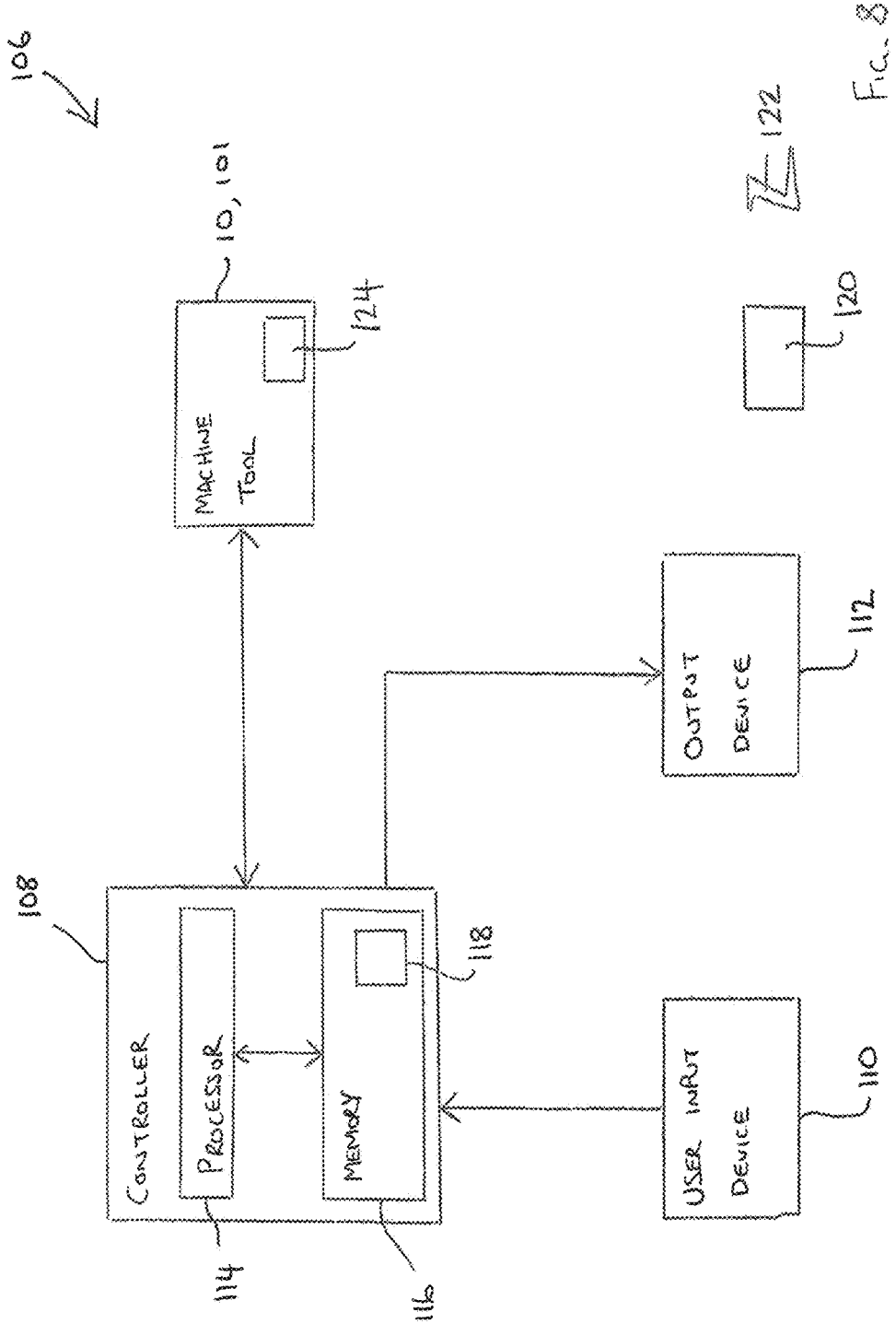
FIG. 8 illustrates a schematic diagram of apparatus for controlling a machine tool according to various examples.

FIG. 8 illustrates a schematic diagram of apparatus 106 for controlling the machine tool 10, 101 according to various examples. The apparatus 106 includes a controller 108, the machine tool 10, 101, a user input device 110 and an output device 112. In some examples, the apparatus 106 may be a module. For example, where the apparatus 106 is a module, the apparatus 106 may only include the controller 108, and the remaining features (such as the machine tool 10, 101) may be added by another manufacturer, or by an end user.

The controller 108, the machine tool 10, 101, the user input device 110, and the output device 112 may be coupled to one another via a wireless link and may consequently comprise transceiver circuitry and one or more antennas. Additionally or alternatively, the controller 108, the machine tool 10, 101, the user input device 110 and the output device 112 may be coupled to one another via a wired link and may consequently comprise interface circuitry (such as a Universal Serial Bus (USB) socket). It should be appreciated that the controller 108, the machine tool 10, 101, the user input device 110, and the output device 112 may be coupled to one another via any combination of wired and wireless links.

The controller 108 may comprise any suitable circuitry to cause performance of the methods described herein and as illustrated in FIGS. 9, 10, 11, and 12. The controller 108 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller, and/or a central processing unit (CPU) and/or a graphics processing unit (GPU), to perform the methods.

Figure 9:
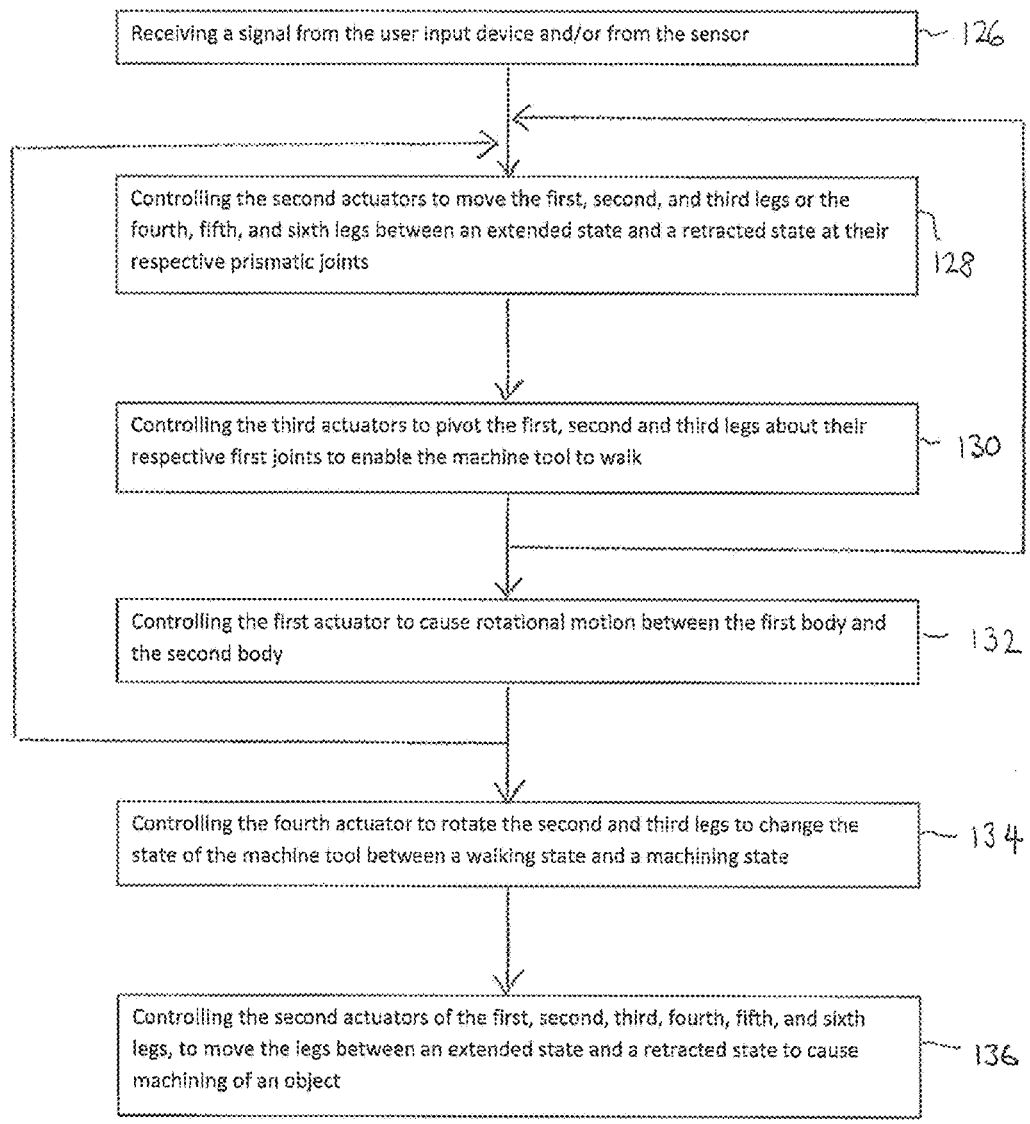
FIG. 9 illustrates a flow diagram of a method of controlling a machine tool according to various examples.

By way of an example, the controller 108 may comprise at least one processor 114 and at least one memory 116. The memory 116 stores a computer program 118 comprising computer readable instructions that, when read by the processor 114, causes performance of the methods described herein, and as illustrated in FIG. 9. The computer program 118 may be software or firmware, or may be a combination of software and firmware.

The processor 114 may be located on the machine tool 10, 101, or may be located remote from the machine tool 10, 101, or may be distributed between the machine tool 10, 101 and a location remote from the machine tool 10, 101. The processor 114 may include at least one microprocessor and may comprise a single core processor, or may comprise multiple processor cores (such as a dual core processor or a quad core processor).

The memory 116 may be located on the machine tool 10, 101 or may be located remote from the machine tool 10, 101, or may be distributed between the machine tool 10, 101 and a location remote from the machine tool 10, 101. The memory 116 may be any suitable non-transitory computer readable storage medium, data storage device or devices, and may comprise a hard disk and/or solid state memory (such as flash memory). The memory 116 may be permanent non-removable memory, or may be removable memory (such as a universal serial bus (USB) flash drive).

The computer program 118 may be stored on a non-transitory computer readable storage medium 120. The computer program 118 may be transferred from the non-transitory computer readable storage medium 120 to the memory 116. The non-transitory computer readable storage medium 120 may be, for example, a USB flash drive, a compact disc (CD), a digital versatile disc (DVD) or a Blu-ray disc. In some examples, the computer program 118 may be transferred to the memory 116 via a wireless signal 122 or via a wired signal 122.

The user input device 110 may comprise any suitable device for enabling an operator to at least partially control the machine tool 10, 101. For example, the user input device 110 may comprise one or more of a keyboard, a keypad, a touchpad, a touchscreen display, and a computer mouse. The controller 108 is configured to receive signals from the user input device 110.

The output device 112 may comprise any suitable device for conveying information to a user. For example, the output device 112 may be a display (such as a liquid crystal display, or a light emitting diode display, or an active matrix organic light emitting diode display, or a thin film transistor display, or a cathode ray tube display) and/or a loudspeaker. The controller 108 is configured to provide a signal to the output device 112 to cause the output device 112 to convey information to the user.

As described in detail below with reference to FIG. 9, the controller 108 is configured to control the operation of the machine tool 10, 101. For example, the controller 108 is configured to control the first actuator 34, the second actuators 56, the third actuators 58, the fourth actuator 78 and the fifth actuator 89 to control movement of the machine tool 101.

In some examples, the machine tool 10, 101 may comprise one or more sensors 124 for sensing a parameter of the machine tool 10, 101 (such as orientation of the machine tool 10, 101) and/or for sensing a parameter external to the machine tool 10, 101 (for example, temperature of the atmosphere, radiation levels). The one or more sensors 124 may comprise at least one camera (such as a charge coupled device (CCD) camera or a complementary metal oxide sensor (CMOS) camera) for obtaining image data. The controller 108 is configured to receive data from the one or more sensors 124 of the machine tool 10, 101.

The operation of the machine tool 10, 101 and the apparatus 106 is described in the following paragraphs with reference to FIGS. 9 to 12.

FIG. 9 illustrates a flow diagram of a method of controlling the machine tool 10, 101 according to various examples. At block 126, the method includes receiving a signal from the user input device 110 and/or from the sensor 124. For example, the controller 108 may receive a signal from the user input device 110 that indicates the operator's desired motion of the machine tool 10, 101 (such forward motion, and change in direction of motion). By way of another example, the controller 108 may receive a signal from the one or more sensors 124 for the proximity of objects in the vicinity of the machine tool 10, 101.

At block 128, the method includes controlling the second actuators 56 to move the first, second and third legs 18, 20, 22, or the fourth, fifth and sixth legs 26, 28, 30 between the extended state and the retracted state at their respective prismatic joints 52. For example, the controller 108 may convert a user input signal or a sensor signal received at block 126 into control signals for the second actuators 56 and then send the control signals to the second actuators 56 of the first, second and third legs 18, 20, 22, or the second actuators 56 of the fourth, fifth and sixth legs 26, 28, 30. Performance of block 128 may cause the first body 12 and the first, second, and third legs 18, 20, 22 to be supported by the fourth, fifth and sixth legs 26, 28, 30. Performance of block 128 may alternatively cause the second body 14 and the fourth, fifth, and sixth legs 26, 28, 30 to be supported by the first, second and third legs 18, 20, 22.

At block 130, the method includes controlling the third actuators 58 to pivot the first, second and third legs 18, 20, 22 about their respective first joints 24 to enable the machine tool 10, 101 to walk. For example, the controller 108 may convert a user input signal or a sensor signal received at block 126 into control signals for the third actuators 58 and then send the control signals to the third actuators 58 of the first, second and third legs 18, 20, 22 to cause them to pivot about their first joints 24. For example, the controller 108 may control the first servomotor 60 to provide tension to the cables 70 and control the second servomotor 62 to provide little or no tension to the cables 71 to cause the leg to pivot in the direction of arrow 74. By way of another example, the controller 108 may control the first servomotor 60 to provide little or no tension to the cables 70 and control the second servomotor 62 to provide tension to the cables 71 to cause the leg to pivot in the direction of the arrow 76.

At block 132, the method includes controlling the first actuator 34 to cause rotational motion between the first body 12 and the second body 14. For example, where the first body 12 and the first, second, third legs 18, 20, 22 are being supported by the fourth, fifth and sixth legs 26, 28, 30, the controller 108 may control the first actuator 34 to rotate the first body 12 relative to the second body 14 to cause a change in walking direction of the machine tool 10, 101. The controller 108 may cause a change in the walking direction of the machine tool 10, 101 in accordance with user instructions from the user input device 110 or due to data from the one or more sensors 124 (for example, in response to sensor data indicating that an obstacle in the current walking path of the machine tool 10, 101). By way of another example, where the first, second, third, fourth, fifth and sixth legs 18, 20, 22, 26, 28, 30 support the first body 12 and the second body 14 on a surface, the controller 108 may control the first actuator 34 to rotate the first body 12 and the second body 14 relative to one another to change the machining stiffness of the machine tool 10, 101.

At block 134, the method includes controlling the fourth actuator 78 to rotate the second and third legs 20, 22 to change the state of the machine tool 10, 101 between a walking state and a machining state. For example, the controller 108 may control the fourth actuator 78 to rotate the second and third legs 20, 22 in accordance with user instructions from the user input device 110 that request a change between the walking state and the machining state. By way of another example, the controller 108 may control the fourth actuator 78 to rotate the second and third legs 20, 20 in accordance with sensor data from the one or more sensors 124 (for example, where the sensor data indicates that the machine tool 10, 101 has reached an object for machining).

At block 136, the method includes controlling the second actuators 56 of the first, second, third, fourth, fifth, and sixth legs 18, 20, 22, 26, 28, 30 to move the legs between their extended state and their retracted state to cause machining of an object. Block 136 may also include controlling the third actuators 58 of the first, second, third, fourth, fifth and sixth legs 18, 20, 22, 26, 28, 30 so that the cables 70, 71, 102 are slack and the legs may pivot about the first and second joints 24, 32 with three degrees of freedom. For example, the controller 108 may control the second actuators 56 and the third actuators 58 so that the machine tool 10, 101 functions as a Stewart platform and machines an object using a tool coupled to the tool holder 16.

The operation of the machine tool 101 in walking across a relatively flat surface 138 is described in the following paragraphs with reference to FIGS. 10A to 10G.

Figure 10A:
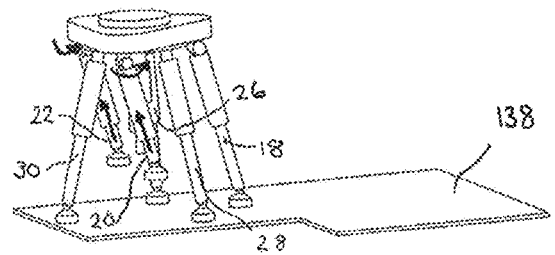
FIGS. 10A to 10G illustrate a perspective view of motion of the machine tool illustrated in FIG. 3 along flat terrain.

In FIG. 10A, the controller 108 controls the second actuators 56 of the second and third legs 20, 22 to retract (block 128) and then controls the third actuators 58 of the second and third legs 20, 22 to rotate the second and third legs 20, 22 forwards (block 130). At this stage, the machine tool 101 is being supported by the fourth, fifth and sixth legs 26, 28, 30.

Figure 10B:
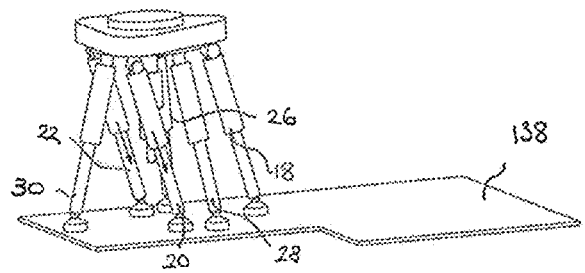

In FIG. 10B, the controller 108 controls the second actuators 56 of the second and third legs 20, 22 to extend until the feet 50 of the second and third legs 20, 22 contact the surface 138 (block 128). The controller 108 may additionally control electromagnets or an air pump to secure the feet 50 of the second and third legs 20, 22 to the surface 138.

Figure 10C:
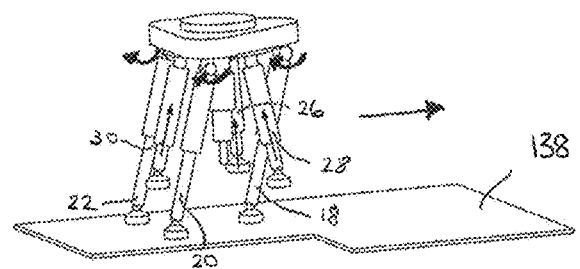

In FIG. 10C, the controller 108 controls the second actuators 56 of the fourth, fifth and sixth legs 26, 28, 30 to retract the fourth, fifth and sixth legs 26, 28, 30 (block 128). The controller 108 then controls the third actuators 58 of the first, second and third legs 18, 20, 22 to rotate (block 130) to move the machine tool 101 forwards. At this stage, the machine tool 101 is being supported by the first, second and third legs 18, 20, 22.

Figure 10D:
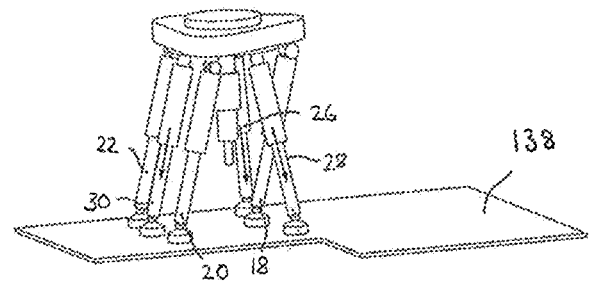

At FIG. 10D, the controller 108 controls the second actuators 56 of the fourth, fifth and sixth legs 26, 28, 30 to extend until the feet 50 of the fourth, fifth and sixth legs 26, 28, 30 contact the surface 138 (block 128). The controller 108 may additionally control electromagnets or an air pump to secure the feet 50 of the fourth, fifth and sixth legs 26, 28, 30 to the surface 138.

Figure 10E:
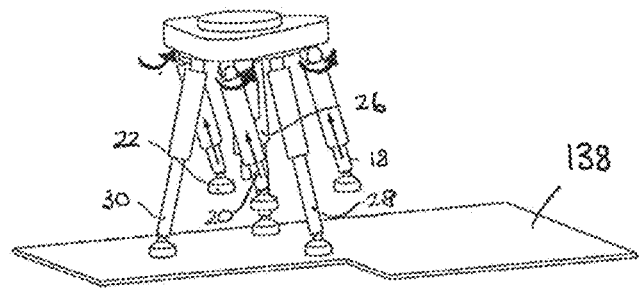

At FIG. 10E, the controller 108 controls the second actuators 56 of the first, second and third legs 18, 20, 22 to retract the first, second and third legs 18, 20, 22 (block 128). Next, the controller 108 controls the third actuators 58 of the first, second and third legs 18, 20, 22 to rotate the first, second and third legs 18, 20, 22 forwards (block 130). At this stage, the machine tool 101 is being supported by the fourth, fifth and sixth legs 26, 28 and 30.

Figure 10F:
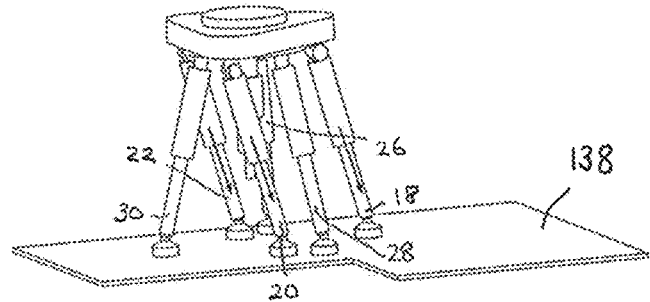

At FIG. 10F, the controller 108 controls the second actuators 56 of the first, second and third legs 18, 20, 22 to extend until the feet 50 of the first, second and third legs 18, 20, 22 contact the surface 138 (block 128). The controller 108 may additionally control electromagnets or an air pump to secure the feet 50 of the first, second and third legs 18, 20, 22 to the surface 138.

Figure 10G:
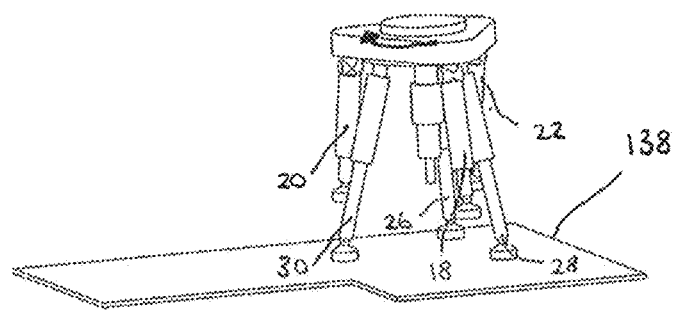

At FIG. 10G, the controller 108 controls the first actuator 34 to rotate the first body 12 relative to the second body 14 (through ninety degrees as illustrated in FIG. 10G) to change the direction of walking of the machine tool 101 while the first, second and third legs 18, 20, 22 are retracted (block 132).

The operation of the machine tool 101 in walking across a surface 138 and up a step 140 is described in the following paragraphs with reference to FIGS. 11A to 11F.

Figure 11A:
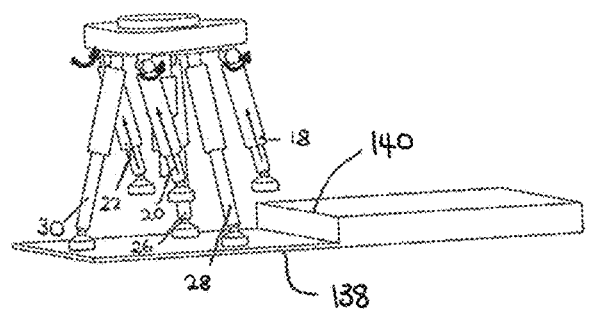
FIGS. 11A to 11F illustrate a perspective view of motion of the machine tool illustrated in FIG. 3 along terrain including a step.

At FIG. 11A, the controller 108 controls the second actuators 56 of the first, second and third legs 18, 20, 22 to retract the first, second and third legs 18, 20, 22 (block 128). Then, the controller 108 controls the third actuators 58 of the first, second and third legs 18, 20, 30 to rotate the first, second and third legs 18, 20, 22 forwards (block 130). At this stage, the machine tool 101 is being supported by the fourth, fifth and sixth legs 26, 28, 30.

Figure 11B:
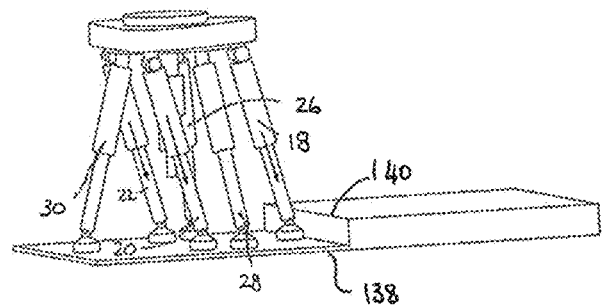

At FIG. 11B, the controller 108 controls the second actuators 56 of the first, second and third legs 18, 20 to extend until the feet 50 of the first, second and third legs 18, 20, 22 contact the surface 138 (block 128). The controller 108 may additionally control electromagnets or an air pump to secure the feet 50 of the first, second and third legs 18, 20, 22 to the surface 138.

Figure 11C:
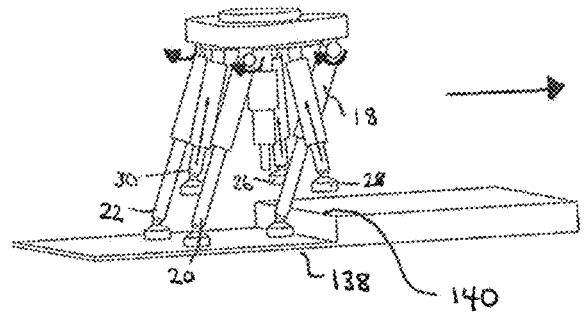

At FIG. 11C, the controller 108 controls the second actuators 56 of the fourth, fifth and sixth legs 26, 28, 30 to retract from the surface 138 (block 128). Next, the controller 108 controls the third actuators 58 of the first, second and third legs 18, 20, 22 to rotate backwards (block 130) and thereby move the machine tool 101 forwards.

Figure 11D:
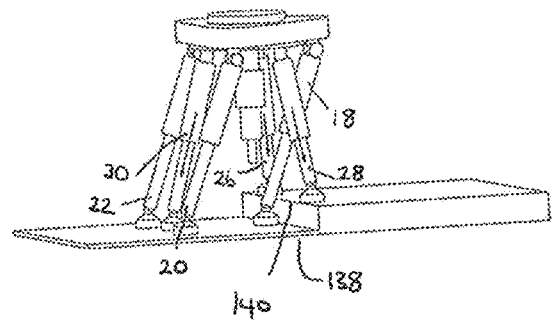

At FIG. 11D, the controller 108 controls the second actuators 56 of the fourth, fifth and sixth legs 26, 28, 30 to extend until the feet 50 of the fourth and fifth legs 26, 28 contact the step 140 and until the foot 50 of the sixth leg 30 contacts the surface 138 beneath the step 140 (block 128).

Figure 11E:
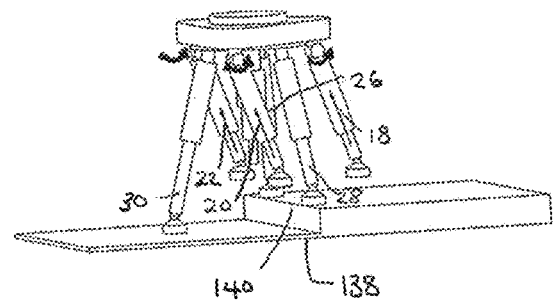

At FIG. 11E, the controller 108 controls the second actuators 56 of the first, second and third legs 18, 20, 22 to retract the first, second and third legs 18, 20, 22 from the surface 138 (block 128). Next, the controller 108 controls the third actuators 58 of the first, second and third legs 18, 20, 22 to rotate the first, second and third legs 18, 20, 22 forwards (block 130).

Figure 11F:
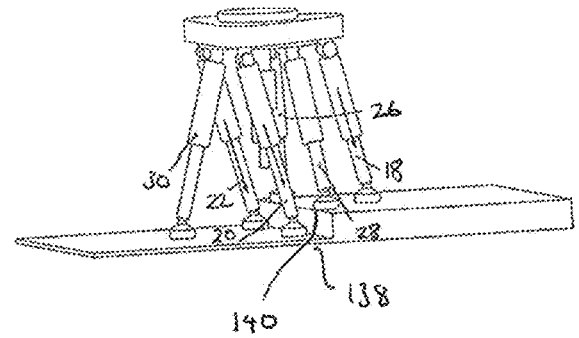

At FIG. 11F, the controller 108 controls the second actuators 56 of the first, second and third legs 18, 20, 22 to extend until the foot 50 of the first leg 18 contacts the step 140 and until the feet 50 of the second and third legs 20, 22 contacts the surface 138 beneath the step 140 (block 128).

The controller 108 may then repeat the blocks illustrated in FIGS. 11C to 11F to continue to walk up the step 140 and across the surface 138.

The operation of a further machine tool 140 in changing machining stiffness is described in the following paragraphs with reference to FIGS. 12A to 12D. The machine tool 140 has substantially the same structure as the machine tool 101 and differs only in that the first body 12 and the second body 14 have a three armed star shape (where a leg is positioned at the end of each arm) instead of having a triangular shape.

Figure 12A:
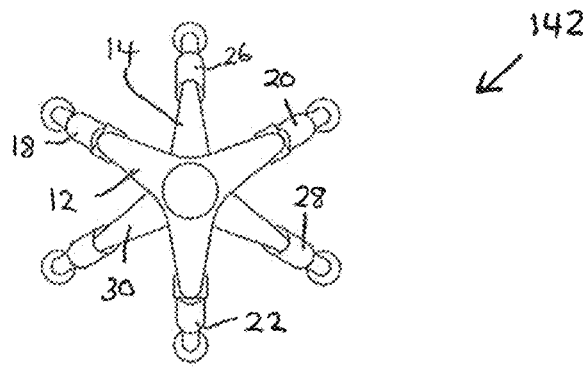
FIGS. 12A to 12D illustrate a plan view of rotary motion of a further machine tool according to various examples.

At FIG. 12A, the first body 12, the second body 14 and the first to sixth legs 18, 20, 22, 26, 28, 30 are arranged so that an angle of sixty degrees is defined between the first leg 18 and the fourth leg 26, between the fourth leg 26 and the second leg 20, between the second leg 20 and the fifth leg 28, between the fifth leg 28 and the third leg 22, between the third leg 22 and the sixth leg 30, and between the sixth leg 30 and the first leg 18.

Figure 12B:
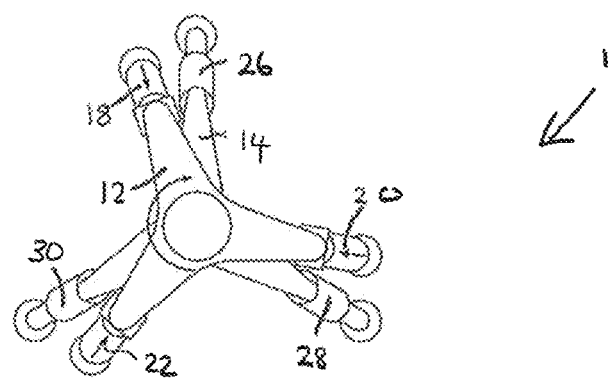

At FIG. 12B, the controller 108 controls the second actuators 56 of the first, second and third legs 18, 20, 22 to retract (block 128). The controller 108 then controls the first actuator 34 to rotate the first body 12 clockwise relative to the second body 14 (block 132) to reduce the angle defined between the first leg 18 and the fourth leg 26, between the fourth leg 26 and the second leg 20, between the second leg 20 and the fifth leg 28, between the fifth leg 28 and the third leg 22, between the third leg 22 and the sixth leg 30, and between the sixth leg 30 and the first leg 18.

Figure 12C:
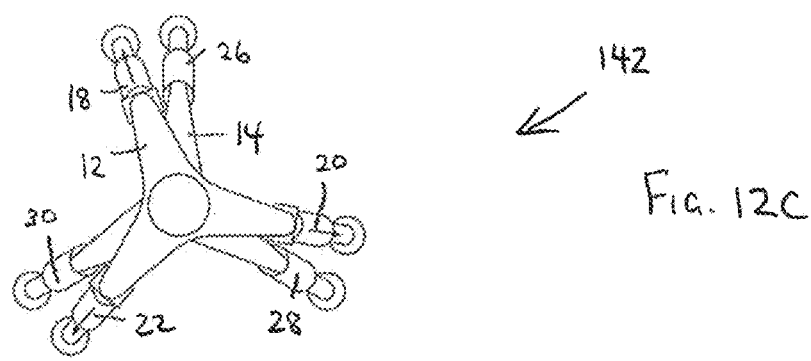

At FIG. 12C, the controller 108 controls the second actuators 56 of the first, second and third legs 18, 20, 22 to extend (block 128) so that the feet 50 of the first, second and third legs 18, 20, 22 contact a surface.

Figure 12D:
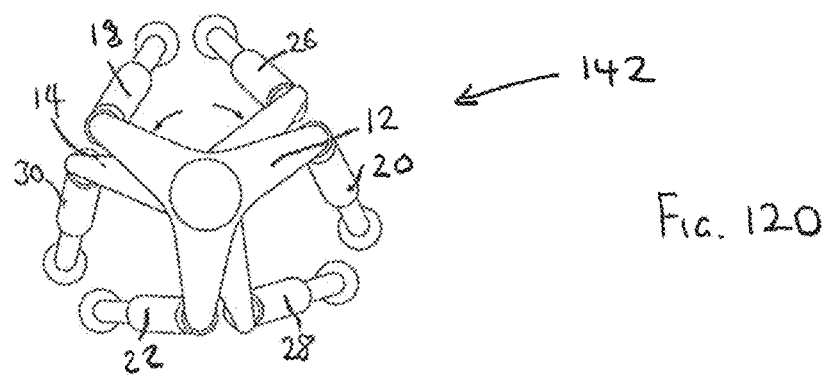

At FIG. 12D, the controller 108 controls the first actuator 34 to rotate the first body 12 anti-clockwise and the second body 14 clockwise to advantageously select the work volume and stiffness of the machine tool 101 (where the stiffness of the machine tool 101 is greater where the legs 18, 20, 22, 26, 28, 30 are positioned closer together). The controller 108 may then control the third actuators 58 of the first, second, third, fourth, fifth and sixth legs 18, 20, 22, 26, 28, 30 so that the cables 70, 71, 102 are slack and enable rotation of the legs about their first and second joints 24, 32. The controller 108 may then control the second actuators 56 of the first, second, third, fourth, fifth and sixth legs 18, 20, 22, 26, 28, 30 to move the legs between the extended state and the retracted state to cause machining of an object (block 136).

The machine tool 10, 101, 140 may provide several advantages. First, the machine tool 10, 101, 140 may rotate and navigate steps relatively easily and may thus be able to enter and manoeuvre within confined spaces. Second, the machine tool 10, 101, 140 may require less actuators than existing similar robotics. Consequently, the machine tool 10, 101, 140 may be relatively light-weight and compact when compared to such robots. Third, the machine tool 10, 101, 140 may be relatively stable when walking due to the legs 18, 20, 22 having one degree of freedom and the legs 26, 28, 30 being locked. Fourth, the machine tool 10, 101, 140 may advantageously have a variable machining stiffness through rotation between the first body 12 and the second body 14.

It will be understood that the disclosure is not limited to the embodiments above-described and various modifications and improvements can be made without departing from the concepts described herein.

Figure 13:
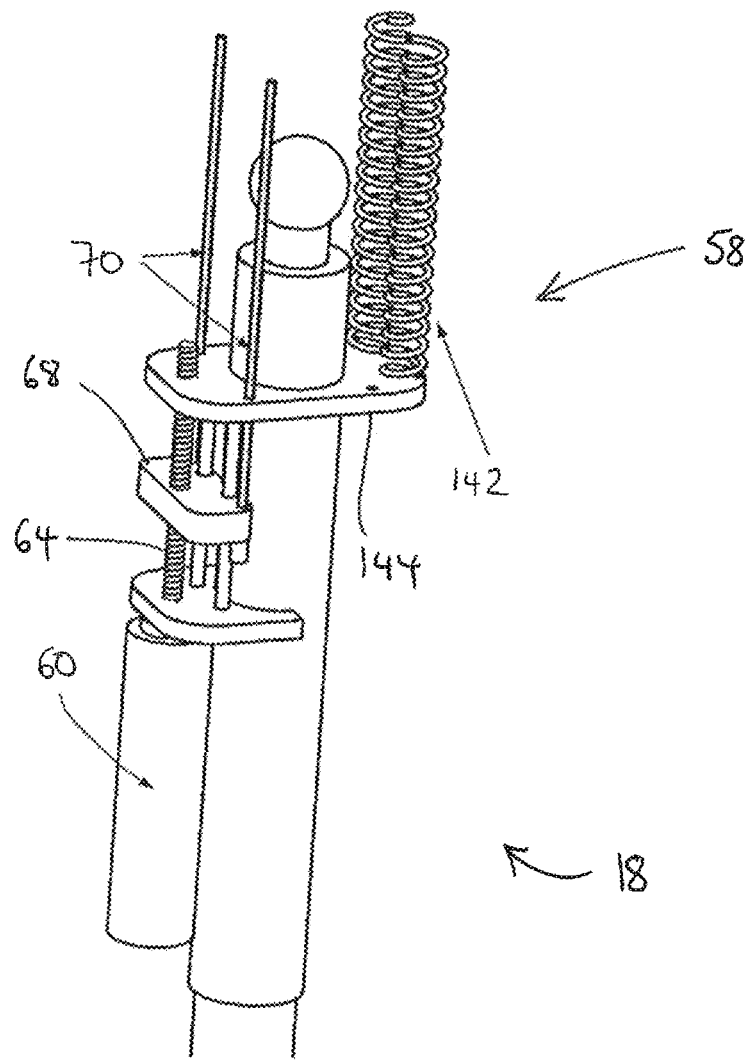
FIG. 13 illustrates a perspective view of another first joint of a machine tool according to various examples.

For example, one or more of the third actuators 58 may have the alternative structure illustrated in FIG. 13. The third actuator 58 illustrated in FIG. 13 comprises a resilient member 142 instead of the second servomotor 62, the second screw 66, the second cable anchor 69 and the second pair of cables 71. In the illustrated example, the resilient member 142 comprises a pair of parallel springs that extend between the first body 12 and a support member 144 connected to the first leg 18 (for example). The resilient member 142 is selected to provide sufficient force to drive the first leg 18 forwards and backwards in cooperation with the first servomotor 60. The third actuator 58 illustrated in FIG. 13 may be advantageous in that it may reduce the number of motors of a machine tool and may consequently reduce the weight and complexity of the machine tool.

Except where mutually exclusive, any of the features may be employed separately or in combination with any other features and the disclosure extends to and includes all combinations and sub-combinations of one or more features described herein.

What is claimed is:

1. A machine tool comprising:
a first body;
a first leg, a second leg, and a third leg coupled to the first body via first joints and configured to support at least the first body;
a second body including a tool holder;
a fourth leg, a fifth leg, and a sixth leg coupled to the second body via second joints and configured to support at least the second body; and
a first actuator coupled to the first body and to the second body, the first actuator being configured to cause rotational motion between the first body and the second body to enable a change in walking direction of the machine tool and/or to enable a change in machining stiffness and a change in work volume of the machine tool;
wherein the first actuator is configured to cause rotational motion between the first body and the second body while the first leg, the second leg, the third leg, the fourth leg, the fifth leg and the sixth leg contact a surface to change the machining stiffness of the machine tool.

2. A machine tool as claimed in claim 1, wherein the first body has a first axis and the second body has a second axis, the first axis and the second axis being offset relative to one another so that the first body and the second body are eccentric.

3. A machine tool as claimed in claim 1, wherein the first body has a first axis and the second body has a second axis, the first axis and the second axis defining a common centre of the first body and the second body so that the first body and the second body are concentric.

4. A machine tool as claimed in claim 1, wherein the first leg, the second leg, the third leg, the fourth leg, the fifth leg, and the sixth leg each comprise: a second actuator and a prismatic joint, the second actuators being configured to move the respective legs between an extended state and a retracted state at their respective prismatic joints.

5. A machine tool as claimed in claim 4, wherein the fourth leg, the fifth leg, and the sixth leg are configured to support the machine tool while in the extended state and while the first leg, the second leg and the third leg are in the retracted state, to enable the first actuator to cause rotational motion between the first body and the second body to enable a change in walking direction of the machine tool.

6. A machine tool as claimed in claim 1, wherein the first leg, the second leg and the third leg each comprise a third actuator, the third actuators being configured to pivot the respective first, second and third legs about their respective first joints to enable the machine tool to walk.

7. A machine tool as claimed in claim 1, wherein the second leg and the third leg are configured to rotate relative to the first body, the machine tool comprising a fourth actuator to rotate the second and third legs to change the state of the machine tool between a walking state and a machining state.

8. A machine tool as claimed in claim 1, wherein the second body includes a first cylindrical protrusion and the first actuator comprises a gear positioned adjacent to the first cylindrical protrusion, the first body defining a cavity therein for receiving the first cylindrical protrusion and the gear, the first body including a plurality of teeth within the cavity for engaging the gear of the first actuator.

9. A machine tool as claimed in claim 8, wherein the second body includes a second cylindrical protrusion positioned within the first cylindrical protrusion, the second cylindrical protrusion being eccentric with the second axis of the second body and with the first cylindrical protrusion, the second cylindrical protrusion being coupled to the tool holder, the tool holder being eccentric with the second cylindrical protrusion.

10. A method of controlling a machine tool as claimed in claim 1, the method comprising:
  receiving a signal from a user input device and/or from a sensor; and
  controlling the first actuator, using the received signal, to cause rotational motion between the first body and the second body.

11. A method as claimed in claim 10, wherein the first leg, the second leg, the third leg, the fourth leg, the fifth leg, and the sixth leg each comprise: a second actuator and a prismatic joint, the method further comprising controlling the second actuators of the first, second, and third legs or the second actuators of the fourth, fifth, and sixth legs, to move the respective legs between an extended state and a retracted state at their respective prismatic joints.

12. A method as claimed in claim 10, wherein the first leg, the second leg and the third leg each comprise a third actuator, the method further comprising controlling the third actuators to pivot the respective first, second and third legs about their respective first joints to enable the machine tool to walk.

13. A method as claimed in claim 10, wherein the second leg and the third leg are configured to rotate relative to the first body and the machine tool further comprises a fourth actuator for rotating the second and third legs relative to the first body, wherein the method further comprises controlling the fourth actuator to rotate the second and third legs to change the state of the machine tool between a walking state and a machining state.

14. Apparatus to control a machine tool, the apparatus comprising:
  a controller to perform the method as claimed in claim 10.

15. A machine tool as claimed in claim 1, wherein:
  each of the first leg, second leg, third leg, fourth leg, fifth leg, and sixth leg includes a foot, and
  when the first actuator causes rotational motion between the first body and the second body while the first leg, second leg, third leg, fourth leg, fifth leg, and sixth leg contact the surface, the foot of each of the first leg, second leg, third leg, fourth leg, fifth leg, and sixth leg maintains its position on the surface.

16. A machine tool as claimed in claim 1, wherein each of the first leg, second leg, third leg, fourth leg, fifth leg, and sixth leg includes an upper part and a lower part, the upper part and lower part configured to extend and retract telescopically.

* * * * *